United States Patent
Encarnación et al.

(10) Patent No.: US 12,002,012 B2
(45) Date of Patent: Jun. 4, 2024

(54) IDENTIFICATION OF TASKS AT RISK IN A COLLABORATIVE PROJECT

(71) Applicant: Microsoft Technology Licensing, LLC, Redmond, WA (US)

(72) Inventors: Mark James Encarnación, Bellevue, WA (US); Nalin Singal, Bellevue, WA (US); Michael Gamon, Seattle, WA (US); Shawon Sarkar, Seattle, WA (US); Nouran Soliman, Lyndhurst, NJ (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 87 days.

(21) Appl. No.: 17/664,041

(22) Filed: May 18, 2022

(65) Prior Publication Data
US 2023/0376902 A1     Nov. 23, 2023

(51) Int. Cl.
| | |
|---|---|
| *G06Q 10/00* | (2023.01) |
| *G06N 3/08* | (2023.01) |
| *G06Q 10/0633* | (2023.01) |
| *G06Q 10/0635* | (2023.01) |
| *G06Q 10/10* | (2023.01) |

(52) U.S. Cl.
CPC .............. *G06Q 10/103* (2013.01); *G06N 3/08* (2013.01); *G06Q 10/0633* (2013.01); *G06Q 10/0635* (2013.01)

(58) Field of Classification Search
USPC ................................. 705/7.27, 7.28; 715/835
See application file for complete search history.

(56) References Cited

U.S. PATENT DOCUMENTS

| | | | | |
|---|---|---|---|---|
| 6,606,744 | B1* | 8/2003 | Mikurak | H04L 9/40 717/174 |
| 10,735,212 | B1* | 8/2020 | Zarakas | G06N 3/084 |
| 11,049,077 | B1* | 6/2021 | Vukich | G06Q 10/1095 |
| 11,531,948 | B2* | 12/2022 | Dubey | G06N 5/043 |

(Continued)

OTHER PUBLICATIONS

Carbonneau, Real, Kevin Laframboise, and Rustam Vahidov. "Application of machine learning techniques for supply chain demand forecasting." European journal of operational research 184.3 (2008): 1140-1154. (Year: 2008).*

(Continued)

*Primary Examiner* — Gurkanwaljit Singh
(74) *Attorney, Agent, or Firm* — Alleman Hall & Tuttle LLP

(57) ABSTRACT

A computing system for identifying tasks at risk in a collaborative project includes one or more processors configured to execute, during an inference-time phase, a collaborative project management program and a machine learning model. The collaborative project management program is configured to receive telemetry data associated with a task, process the telemetry data based at least in part on one or more task attributes, and output at least one feature associated with the task. The machine learning model is configured to receive, as inference-time input, the at least one feature associated with the task, and, responsive to receiving the at least one feature, output a risk prediction for the task. The system is configured to output an alert when the task is predicted to be at risk of not being completed by a predetermined due date.

20 Claims, 9 Drawing Sheets

(56) References Cited

U.S. PATENT DOCUMENTS

| | | | | |
|---|---|---|---|---|
| 2003/0106039 | A1* | 6/2003 | Rosnow | G06Q 10/06 717/100 |
| 2004/0064351 | A1* | 4/2004 | Mikurak | G06Q 30/0269 705/22 |
| 2006/0095915 | A1* | 5/2006 | Clater | G06Q 10/10 718/100 |
| 2015/0082281 | A1* | 3/2015 | Koenig | G06F 11/3664 717/124 |
| 2016/0077674 | A1* | 3/2016 | Forster | H04L 51/04 715/753 |
| 2016/0140501 | A1* | 5/2016 | Figlin | G06Q 10/063114 705/7.15 |
| 2017/0116552 | A1* | 4/2017 | Deodhar | G06Q 10/0639 |
| 2017/0300844 | A1* | 10/2017 | Urry | G06Q 10/06313 |
| 2017/0337287 | A1* | 11/2017 | Gill | G06Q 10/06311 |
| 2018/0365628 | A1* | 12/2018 | Bhaskaran | G06Q 10/063112 |
| 2019/0320038 | A1* | 10/2019 | Walsh | H04L 67/567 |
| 2019/0384790 | A1* | 12/2019 | Bequet | G06N 3/084 |
| 2020/0026571 | A1* | 1/2020 | Bahramshahry | G06F 9/5005 |
| 2021/0174274 | A1* | 6/2021 | Nair | G06F 18/24147 |
| 2021/0201271 | A1* | 7/2021 | Vukich | G06N 20/00 |
| 2021/0256434 | A1* | 8/2021 | Dubey | G06Q 10/06316 |

OTHER PUBLICATIONS

Tampuu, Ardi, et al. "Multiagent Cooperation and Competition with Deep Reinforcement Learning." arXiv preprint arXiv:1511.08779 (2015). (Year: 2015).*

Zhou, et al., "Temporal common sense acquisition with minimal supervision", In Repository of arXiv:2005.04304v1, May 8, 2020, 11 Pages.

Refanidis, et al., "A Constraint-Based Approach to Scheduling an Individual's Activities", In Journal of ACM Transactions on Intelligent Systems and Technology, vol. 1, Issue 2, Nov. 2010, pp. 1-32.

Rong, et al., "Managing Uncertainty in Time Expressions for Virtual Assistants", In Proceedings of the CHI Conference on Human Factors in Computing Systems, May 6, 2017, pp. 568-579.

Sarrafzadeh, et al., "Characterizing and Predicting Email Deferral Behavior", In Proceedings of the Twelfth ACM International Conference on Web Search and Data Mining, Feb. 11, 2019, pp. 627-635.

Sarrafzadeh, et al., "Characterizing stage-aware writing assistance for collaborative document authoring", In Proceedings of the ACM on Human-Computer Interaction, Jan. 5, 2021, 29 Pages.

Sharma, et al., "Predicting the priority of a reported bug using machine learning techniques and cross project validation", In Proceedings of 12th International Conference on Intelligent Systems Design and Applications, Nov. 27, 2012, pp. 539-545.

Submitters, O, "Essence-Kernel and Language for Software Engineering Methods", Retrieved from: https://citeseerx.ist.psu.edu/viewdoc/download?doi=10.1.1.368.2022&rep=rep1&type=pdf, Aug. 13, 2012, 207 Pages.

Teevan, et al., "Selfsourcing Personal Tasks", In Extended Abstracts on Human Factors in Computing Systems, Apr. 26, 2014, 6 Pages.

Tutty, et al., "Computer-mediated instruction: A comparison of online and face-to-face collaboration", In Educational Technology Research and Development, 56, 2, Apr. 2008, pp. 101-124.

White, et al., "Current practice in project management—an empirical study", In International Journal of Project Management, vol. 20, Issue 1, Jan. 2002, pp. 1-11.

White, et al., "Microtask detection", In Journal of ACM Transactions on Information Systems, vol. 39, No. 2, Jan. 2021, 29 Pages.

White, et al., "Task Completion Detection: A Study in the Context of Intelligent Systems", In Proceedings of the 42nd International Conference on Research and Development in Information Retrieval, Jul. 21, 2019, pp. 405-414.

White, et al., "Task Duration Estimation", In Proceedings of the Twelfth ACM International Conference on Web Search and Data Mining, Feb. 11, 2019, pp. 636-644.

Williams, et al., "Mercury: Empowering Programmers' Mobile Work Practices with Microproductivity", In Proceedings of the 32nd Annual ACM Symposium on User Interface Software and Technology, Oct. 20, 2019, pp. 81-94.

Zhang, et al., "Grounded Task Prioritization with Context-Aware Sequential Ranking", In Journal of ACM Transactions on Information Systems (TOIS), vol. 40, Issue 4, Dec. 2021, 28 Pages.

Zhou, et al., "'Going on a vacation' takes longer than 'Going for a walk': A Study of Temporal Commonsense Understanding", In Repository of arXiv:1909.03065v1, Sep. 6, 2019, 10 Pages.

Choetkiertikul, et al., "Characterization and Prediction of Issue-Related Risks in Software Projects", In Proceedings of IEEE/ACM 12th Working Conference on Mining Software Repositories, Feb. 2015, 12 Pages.

Allen, David, "Getting Things Done: The Art of Stress-Free Productivity", In Publication of Penguin Books, Mar. 17, 2015, 358 Pages.

Amabile, et al., "Academic-practitioner collaboration in management research: A case of cross-profession collaboration", In Academy of Management Journal, vol. 44, Issue 2, Apr. 1, 2001, pp. 418-431.

Aram, et al., "The role of project team collaboration in R&D performance", In Journal of Management Science, vol. 22, No. 10, Jun. 1976, pp. 1127-1137.

Aula, et al., "How does search behavior change as search becomes more difficult?", In Proceedings of the SIGCHI Conference on Human Factors in Computing Systems, Apr. 10, 2010, pp. 35-44.

Bellotti, et al., "Walking away from the desktop computer: distributed collaboration and mobility in a product design team", In Proceedings of the ACM Conference on Computer Supported Cooperative Work, Nov. 16, 1996, pp. 209-218.

Blandford, et al., "Group and individual time management tools: what you get is not what you need", In Journal of Personal and Ubiquitous Computing vol. 5, Issue 4, Dec. 2001, pp. 1-27.

Bresler, Liora, "Working in the interpretive zone: Conceptualizing collaboration in qualitative research teams", In Educational Researcher, vol. 25, Issue 5, Jun. 1996, pp. 5-15.

Buehler, et al., "It's about time: Optimistic predictions in work and love", In Journal of European Review of Social Psychology, vol. 6, Issue 1, Jan. 1, 1995, pp. 1-32.

Bystrom, et al., "Task complexity affects information seeking and use", In Information Processing & Management, vol. 31, Issue 2, Mar. 1, 1995, pp. 191-213.

Cai, et al., "Wait-Learning: Leveraging Wait Time for Second Language Education", In Proceedings of the 33rd Annual ACM Conference on Human Factors in Computing Systems., Apr. 18, 2015, pp. 3701-3710.

Charmaz, et al., "The blackwell encyclopedia of sociology.", In Publication of Blackwell Publishing, 2007, 5783 Pages.

Chasanidou, et al., "Enabling team collaboration with task management tools", In Proceedings of the 12th International Symposium on Open Collaboration, Aug. 17, 2016, 9 Pages.

Cheng, et al., "Break it down: A comparison of macro-and microtasks", In Proceedings of the 33rd Annual ACM Conference on Human Factors in Computing Systems, Apr. 18, 2015, pp. 4061-4064.

Cranshaw, et al., "Calendar.help: Designing a workflow-based scheduling agent with humans in the loop", In Proceedings of the CHI Conference on Human Factors in Computing Systems, May 6, 2017, pp. 2382-2393.

Creswell, et al., "An expanded typology for classifying mixed methods research into designs", In Handbook of Mixed Methods in Social and Behavioral Research, 2003, pp. 209-240.

Dailey, Robert C., "The role of team and task characteristics in R&D team collaborative problem solving and productivity", In Journal of Management Science, vol. 24, Issue 15, Nov. 1978, pp. 1579-1588.

Dietterich, Thomas G., "Ensemble Methods in Machine Learning", In Proceedings of the First International Workshop on Multiple Classifier Systems, Jun. 21, 2000, pp. 1-15.

Eppler, et al., "Managing team knowledge: core processes, tools and enabling factors", In European Management Journal, vol. 18, Issue 3, Jun. 1, 2000, pp. 334-341.

(56) References Cited

OTHER PUBLICATIONS

Forsyth, et al., "Allocating time to future tasks: The effect of task segmentation on planning fallacy bias", In Journal of Memory & Cognition, vol. 36, Issue 4, Jun. 2008, pp. 791-798.
Gadiraju, et al., "A taxonomy of microtasks on the web", In Proceedings of the 25th ACM Conference on Hypertext and Social media, Sep. 1, 2014, pp. 218-223.
Graus, et al., "Analyzing and predicting task reminders", In Proceedings of the Conference on User Modeling Adaptation and Personalization, Jul. 13, 2016, pp. 7-15.
Gusev, et al., "Using query patterns to learn the duration of events", In Proceedings of the Ninth International Conference on Computational Semantics, 2011, pp. 145-154.
Hahn, et al., "Casual microtasking: Embedding microtasks in Facebook", In Proceedings of the CHI Conference on Human Factors in Computing Systems, May 4, 2019, 9 Pages.
Hertel, et al., "Managing virtual teams: A review of current empirical research", In Human Resource Management Review, vol. 15, Issue 1, Mar. 2005, pp. 69-95.
Holton, Judith A. , "Building trust and collaboration in a virtual team", In Team Performance Management: An International Journal, vol. 7, No. 3-4, Jun. 1, 2001, pp. 36-47.
Horvitz, Eric, "Principles of Mixed-Initiative User Interfaces", In Proceedings of the SIGCHI Conference on Human Factors in Computing Systems, May 15, 1999, pp. 159-166.
Hu, et al., "Preference-Based Group Scheduling", In IFIP Conference on Human-Computer Interaction, 2005, pp. 990-993.
Iqbal, et al., "Multitasking with playwrite, a mobile microproductivity writing tool", In Proceedings of the 31st Annual ACM Symposium on User Interface Software and Technology, Oct. 14, 2018, pp. 411-422.
Josephs, et al., "Bias and accuracy in estimates of task duration", In Journal of Organizational Behavior and Human Decision Processes, vol. 61, Issue 2, Feb. 1, 1995, pp. 202-213.
Kahneman, et al., "Intuitive prediction: Biases and Corrective Procedures", In Technical Report PTR-1042-77-6, Jun. 1977, 44 Pages.
Kang, et al., "Zaturi: We put together the 25th hour for you. Create a book for your baby", In Proceedings of the ACM Conference on Computer Supported Cooperative Work and Social Computing, Feb. 25, 2017, pp. 1850-1863.
Kim, Jeonghyun, "Task difficulty as a predictor and indicator of web searching interaction", In CHI'06 extended Abstracts on Human Factors in Computing Systems, Apr. 21, 2006, pp. 959-964.
Konig, Cornelius J., "Anchors distort estimates of expected duration", In Journal of Psychological Reports, vol. 96, Issue 2, Apr. 2005, pp. 253-256.
Kozareva, et al., "Learning Temporal Information for States and Events", In Proceedings of IEEE Fifth International Conference on Semantic Computing, Sep. 18, 2011, pp. 424-429.
Kruger, et al., "If you don't want to be late, enumerate: Unpacking reduces the planning fallacy", In Journal of Experimental Social Psychology, vol. 40, Issue 5, Sep. 1, 2004, pp. 586-598.
Lanubile, et al., "Collaboration tools for global software engineering", In Journal of IEEE Software, vol. 27, Issue 2, Feb. 25, 2010, pp. 52-55.
Li, et al., "A Faceted Approach to Conceptualizing Tasks in Information Seeking", In Proceedings of Information Processing and Management, vol. 44, Issue 6, Nov. 2008, pp. 1823-1837.
Liedtka, Jeanne M., "Collaborating across lines of business for competitive advantage", In Academy of Management Perspectives, vol. 10, No. 2, May 1, 1996, pp. 20-34.
Liu, et al., "Exploring and predicting search task difficulty", In Proceedings of the 21st ACM International Conference on Information and Knowledge Management, Oct. 29, 2012, pp. 1313-1322.
Liu, et al., "Personalizing Information Retrieval for Multi-session Tasks: The Roles of Task Stage and Task Type", In Proceedings of the 33rd International ACM SIGIR Conference on Research and Development in information Retrieval, Jul. 19, 2010, 8 Pages.
Liu, et al., "Predicting search task difficulty at different search stages", In Proceedings of the 23rd ACM International Conference on Information and Knowledge Management, Nov. 3, 2014, pp. 569-578.
Liu, et al., "Task complexity: A review and conceptualization framework", In International Journal of Industrial Ergonomics, vol. 42, Nov. 1, 2012, pp. 553-638.
Mcdonald, et al., "Reliability and Inter-rater Reliability in Qualitative Research: Norms and Guidelines for CSCW and HCI practice", In Proceedings of the ACM on Human-Computer Interaction, Nov. 7, 2019, 23 Pages.
Mishra, et al., "Time-Critical Search", In Proceedings of the 37th international ACM SIGIR Conference on Research & Development in Information Retrieval, Jul. 10, 2014, pp. 747-756.
Moore, et al., "The trouble with overconfidence", In Journal of Psychological Review, vol. 115, Issue 2, Apr. 2008, pp. 502-517.
Myers, et al., "An Intelligent Personal Assistant for Task and Time Management", In Journal of AI Magazine, vol. 28, Issue 2, Jun. 15, 2007, pp. 47-61.
Ning, et al., "Torque: A reading comprehension dataset of temporal ordering questions", In Repository of arXiv:2005.00242v1, May 1, 2020, 15 Pages.
Ocker, et al., "Asynchronous Computer-mediated Communication versus Face-to-face Collaboration: Results on Student Learning, Quality and Satisfaction", In Group Decision and Negotiation, vol. 8, Issue 5, Sep. 1999, pp. 427-440.
Pan, et al., "Annotating and Learning Event Durations in Text", In Journal of Computational Linguistics, vol. 37, Issue 4, Dec. 1, 2011, 26 Pages.
Pezzo, et al., "On the distinction between yuppies and hippies: Individual differences in prediction biases for planning future tasks", In Journal of Personality and Individual Differences, vol. 41, Issue 7, Nov. 1, 2006, pp. 1359-1371.

* cited by examiner

| TASK ATTRIBUTES 22 | |
|---|---|
| INTRINSIC ATTRIBUTES 22I | EXTRINSIC ATTRIBUTES 22E |
| COMPLEXITY | DUE DATE |
| LENGTH | PRIORITY |
| TYPE/NATURE | DEPENDENCIES |
| URGENCY | ASSIGNEES |

FIG. 6

| TASK FEATURES | | | |
|---|---|---|---|
| LEVEL | SIGNAL | NAME | DESCRIPTION |
| PROJECT | HISTORY | NumTasks | NUMBER OF TASKS IN PROJECT |
| BUCKET | HISTORY | NumTasks | NUMBER OF TASKS IN BUCKET |
| TASK | HISTORY | NumPastActions | NO. ACTIONS SINCE CREATION |
| | | AgeInDays | DAYS SINCE TASK CREATION |
| | | PriorityValue | CURRENT PRIORITY OF TASK |
| | COMPLEXITY | TitleCharLength | CHARACTERS IN TASK TITLE |
| | | NumConversationActions | NUMBER OF COMMENTS ON TASK |
| | PROGRESS | PercentCompleteValue | CURRENT PROGRESS % ON TASK |
| USER | WORKLOAD | NumCompTasksByUser | TASKS IN PROJECT COMPLETED |
| | STYLE | NumOfActionsByUser | ACTIONS BY USER IN SESSION |

FIG. 7

IDENTIFICATION OF TASKS AT RISK IN A COLLABORATIVE PROJECT

BACKGROUND

Collaborative project management involves interacting with various tasks in a shared planning space where members add, assign, complete, and edit project-related tasks and have a shared view of the project's status. This process directly impacts how individual team members select, prioritize, coordinate, and organize tasks on which to focus on a daily basis. Project managers may review each team member's progress to ensure that the tasks are completed according to an order and schedule that leads to successfully completing the project on time.

SUMMARY

To facilitate the above process, a computing system for identifying tasks at risk in a collaborative project is provided. The computing system has server-side and client-side aspects. According to one aspect, the computer system includes one or more processors configured to execute, during an inference-time phase, a collaborative project management program and a machine learning model. The collaborative project management program is configured to receive telemetry data associated with a task, process the telemetry data based at least in part on one or more attributes of the task, and output at least one feature associated with the task. The machine learning model is configured to receive, as inference-time input, the at least one feature associated with the task, and, responsive to receiving the at least one feature, output a risk prediction for the task. The system is configured to output an alert when the task is predicted to be at risk of not being completed by a predetermined due date.

In some configurations, the machine learning model is trained during an initial training phase with a training data set including a plurality of training data pairs. Each training data pair may include a training phase input indicating a feature of a task and ground truth output indicating a risk prediction for the paired task. The training data pairs may be derived from training phase telemetry data associated with a plurality of tasks completed by a plurality of users.

In some configurations, the machine learning model is trained during a feedback training phase. The machine learning model may collect user feedback via an implicit or explicit user feedback interface and perform feedback training based at least in part on the user feedback.

In some configurations, the predicted time to completion associated with the task is determined at least in part by a least one attribute of the task. Intrinsic attributes of the task that are independent of a user may include task complexity, a pre-defined length of the task, task type, and urgency. Extrinsic attributes of the task that can be set and changed by a user may include due date, priority, dependencies, and assignees.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 6 is a table of example task attributes of the computing system of FIG. 1.

FIG. 7 is a table of example task features of the computing system of FIG. 1.

DETAILED DESCRIPTION

Successful project collaboration requires each team member to complete one or more tasks associated with the project. For some team members, especially those managing and/or working on multiple projects with different teams, coordinating and organizing various tasks to meet the milestone and deadlines for each project can be challenging. Accordingly, tasks can become at risk of failure to be completed on time, which can lead to personal and/or team losses in many situations.

Figure 1:
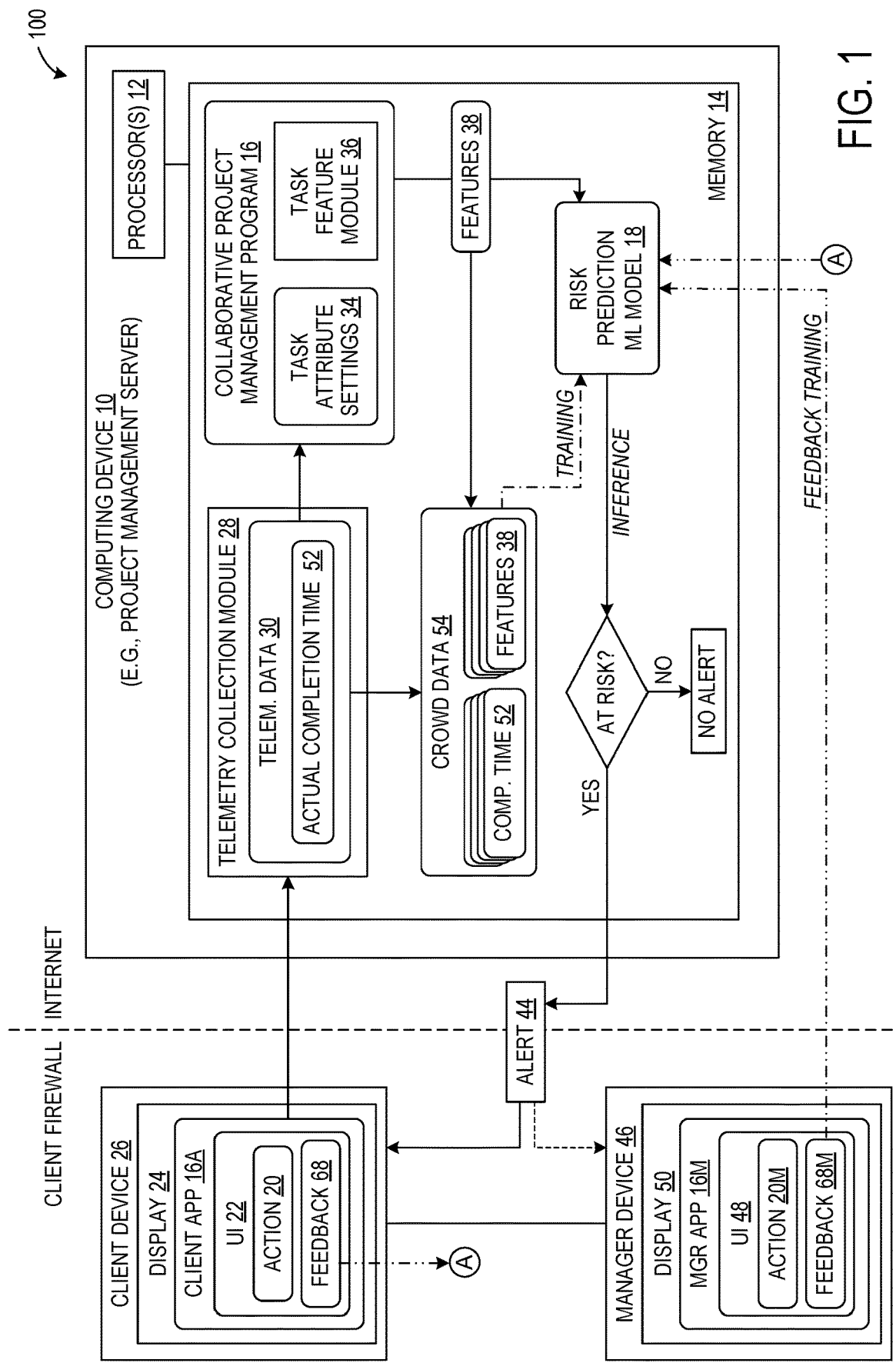
FIG. 1 is a general schematic diagram of a computing system for identifying tasks at risk in a collaborative project, according to an embodiment of the present disclosure.

As schematically illustrated in FIG. 1, to address the above identified issues, a computing system 100 for identifying tasks at risk in a collaborative project is provided. The computing system 100 includes a computing device 10, which may, for example, take the form of a project management server hosted in a data center of a project management platform operator, for example. Alternatively, the computing device 10 may be configured by the project management platform operator to be hosted at a client-specified data center under control of the client, for performance, security, privacy, and/or export compliance reasons, for example. The computing device 10 includes one or more processors 12 and associated memory 14. The one or more processors 12 are configured to execute instructions using portions of the associated memory 14 to implement a collaborative project management program 16 and an artificial intelligence (AI) model that predicts when a task assigned to a user, i.e. project team member, is at risk of not being completed on time. In the embodiments described herein, the AI model is a machine learning (ML) model is referred to as a risk prediction ML model 18. It will be appreciated that more than one team member may be assigned to the same task; however, for the purpose of simplicity, the tasks discussed herein are described as being assigned to a single team member.

The team member may perform an action 20 on the task via a user interface 22 of a client application 16A of the collaborative project management program 16, which is presented on a display 24 of a client device 26. A telemetry collection module 28 included in the computing device 10 detects and processes the action 20, and outputs telemetry data 30 associated with the action 20. The telemetry data 30 may be collected from the client application 16A and/or other software executed on the client device 26 or computing device 10. The collaborative management program 16 is configured to receive the telemetry data 30. The telemetry data 30 may be processed based at least in part of one or more attributes 32 of the task. To this end, the collaborative management program 16 may include task attribute settings 34. In some implementations, the task attribute settings 34 may be included in the computing system 100 as default settings. Additionally or alternatively, the task attribute settings 34 may be uploaded and/or modified by a team member and/or manager of a project. The collaborative project management program 16 may further include a task feature module 36 that is configured to extract and output at least one feature 38 associated with the task from the telemetry data 30. In the embodiment described herein, the at least one feature 38 is one of a plurality of features 38 output by the collaborative project management program 16.

As described in detail below with reference to FIG. 3, the risk prediction ML model 18 is configured to receive, as inference-time input, the features 38 associated with the task, which can be used as signals for predicting tasks that are at risk of failing to be completed on time, or at all. The features 38 may pertain to the project as a whole, a group (i.e., bucket) of related tasks, a single task, or a team member assigned to the task. Accordingly, each feature 38 is categorized as one of a project-level feature, a bucket-level feature, a task-level feature, or a user-level feature, examples of which are described below with reference to FIG. 7 and Table 1. It will be appreciated that the task feature module 36 may be updated as new features 38 are recognized. Responsive to receiving the features 38, the risk prediction ML model 18 is configured to determine whether the task is at risk of not being completed by a predetermined due date.

As described in more detail below with reference to FIGS. 2A, 2B, and 3, the risk prediction ML model 18 is trained to predict, during inference-time (i.e., at a run-time after training during which inference is performed), whether a task is on track to be completed by a predetermined deadline. Continuing with FIG. 1, when the risk prediction ML model 18 determines that the task is at risk of not being completed by the predetermined due date, the computing device 10 is configured to output an alert 44. As shown in FIG. 1, the alert 44 may be sent to the client device 26 where it is presented as a visual alert to the team member via the user interface 22. As discussed in detail below with reference to FIG. 4, the team member may provide feedback regarding the accuracy of the alert 44 for feedback training of the risk prediction ML model 18 via a user feedback interface 68, as indicated by (A) and the dashed-dot-dot line. If the task is not at risk of not being completed by the predetermined due date, the computing device 10 does not output an alert.

In some configurations, the system 100 may include a manager device 46 associated with a manager of the project. The computing device may be configured to output the alert 44 to the manager device 46, instead of or in addition to outputting the alert 44 to the client device 26. As with the client device, the alert 44 may be presented as a visual alert to the manager via a user interface 48 on a display 50. Additionally or alternatively, the alert 44 may be output to the client device 26 and/or the manager device 46 as an aural alert and/or an email alert. It will be appreciated that the visual, aural, and email alerts described herein are merely examples, and that the alert 44 may take any suitable form to convey to a team member and/or project manager that a task is at risk of not being completed by the deadline. As discussed in detail below with reference to FIG. 5, the project manager may perform an action 20M on the task, as well as provide feedback regarding the accuracy of the alert 44 for feedback training of the risk prediction ML model 18 via a manager feedback interface 68M, as indicated by the dashed-dot-dot line.

As shown in FIG. 1, when the team member performs an action 20 to indicate the task has been completed, the telemetry collection module 28 determines the actual completion time 52 of the task, which may be recorded and stored on the computing device 10 as crowd data 54. The crowd data 54 may further include features 38 extracted from telemetry data 30 associated with actions 20. As described in detail below, the risk prediction ML model 18 may be trained on crowd data 54 collected prior to inference-time, as indicated by the dashed-dot line.

Figure 2A:
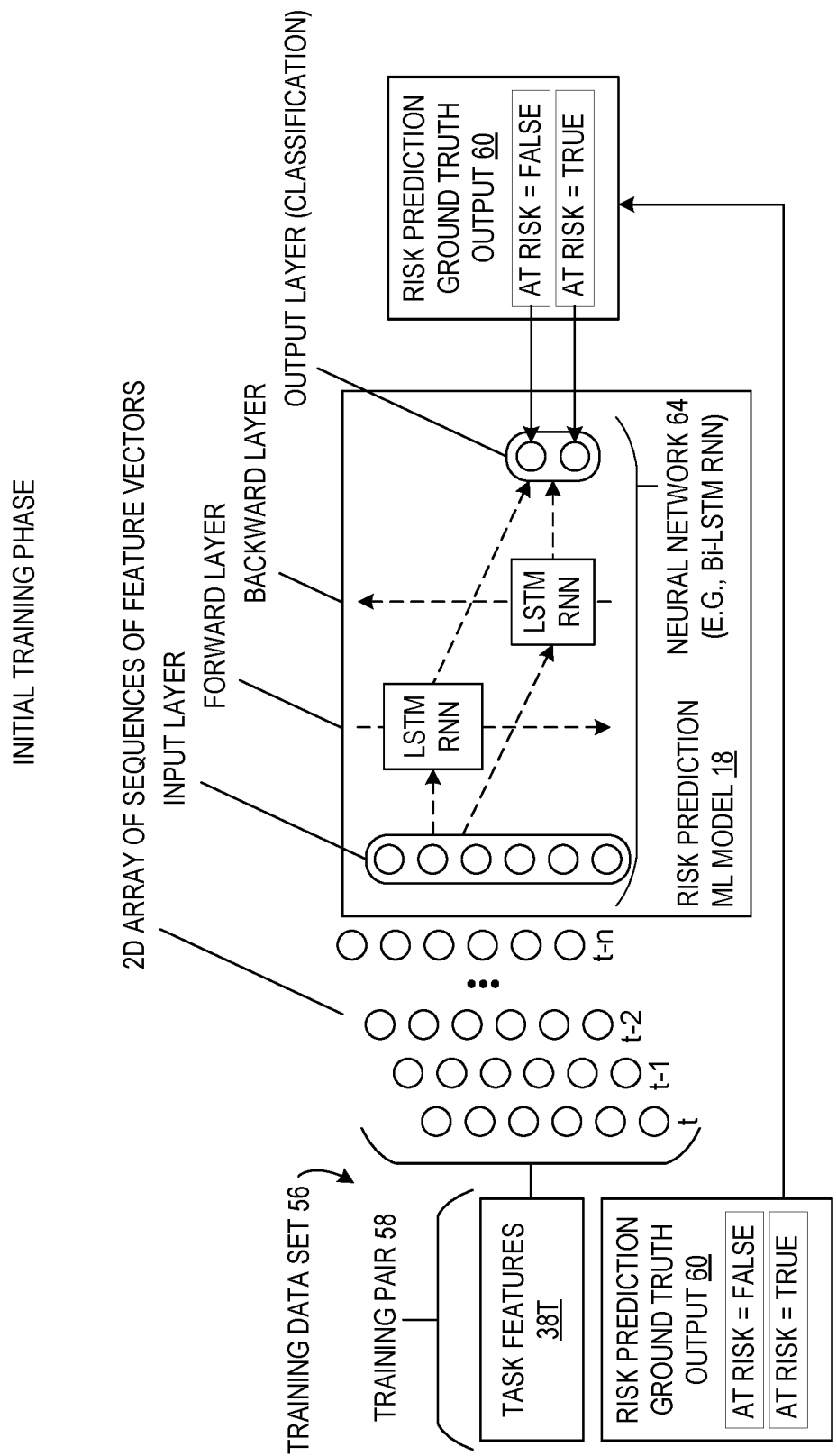
FIGS. 2A and 2B are schematic diagrams of a risk prediction machine learning model of the computing system of FIG. 1 during an initial training phase.

FIG. 2A shows a schematic diagram of the risk prediction ML model 18 during an initial training phase. In the initial training phase, the collaborative project management program 16 is configured to receive training phase telemetry data 30T associated with a plurality of tasks completed by a plurality of users. The risk prediction ML model 18 is trained with a training data set 56 including a plurality of training data pairs 58 derived from the training phase telemetry data 30T and stored as crowd data 54. Each training data pair 58 includes a training phase input indicating a plurality of training phase features 38T associated with a task and ground truth output 60 indicating the predicted risk for the paired task based on the actual completion time 52 of the task.

Each feature 38 of the plurality of features may be parameterized to be numerically encoded. As such, in some implementations, the features 38 may be normalized to have numerical designation between 0 and 1. In other implementations, the designation for each feature 38 may be an absolute value. Each feature 38 may be configured to have a value within a range of 0 to n. For example, the task-level feature 38 AgeInDays specifies a number of days since the task was created. This feature may have a value of 12 to indicate the task was created 12 days ago. The feature NumPastActions may have a value of 0 when no actions have been performed on the task. Additional examples of the features 38 associated with each task are described in detail below with reference to FIG. 7 and Table 1.

The risk prediction ML model 18 may include a neural network 64 configured to receive the parameterized training phase features 38T as an input vector. The neural network 64 may be configured as a recurrent neural network (RNN) with an input layer, one or more fully connected hidden layers, and an output layer. As an RNN, the neural network 64 may be configured as a three-dimensional collection of two-dimensional neural network layers with respective neural network layers configured to process input from corresponding timesteps, and with connections between the nodes of each neural network layer for learning across the timesteps. To improve the ability of the RNN to learn without being overly saturated with signals from prior timesteps and suffering from exploding gradients, the RNN may be equipped with Long Short-Term Memory LSTM gates on each node in the fully connected hidden layers, to thereby form an LSTM RNN. To increase the accuracy of the risk prediction ML model 18, in the depicted embodiment of FIG. 2A, the neural network 64 is shown to be a bidirectional long short-term memory (BiLSTM) RNN in which the input vector is processed in a forward and reverse order by two different LSTM RNNs. The outputs of each LSTM are combined and fed forward to the same output layer, to generate the output of the BiLSTM RNN, which in this case is the classification of at risk or not at risk of not being completed by a deadline.

The input layer includes a plurality of nodes corresponding to the training phase task features 38T. When an RNN is used as neural network 64, the training phase task features 38T may be formatted as a 2D array of feature vectors, in time-order. The feature vectors include sequences of task features in time order, examples of which are described below with reference to FIG. 7 and Table 1. Thus, the input array may include a first input feature vector for the current time t, as well as well as historical input feature vectors from earlier timesteps t-1, t-2 . . . t-n for features related to a task. Based on the features 38 in the 2D input array, an RNN based risk prediction ML model 18 can consider the sequence of features to thereby output a prediction for whether the task is at risk of not being completed on time.

The output layer includes a plurality of output nodes indicating a risk prediction for the task associated with the training data pair 58. During training, ground truth classifications 60 are provided for the output node values. Nodes in each layer are linked by weighted associations, and the risk prediction ML model 18 may be configured to adjust internal weights to enhance one or more of the features via a backpropagation algorithm according to a loss function during training to train the neural network to output a similar output when faced with similar input during inference-time. As shown in FIG. 2A, each training pair 58 in the training data set 56 may be classified as "At Risk=False" or "At Risk=True." Tasks that were completed before the predetermined due date have a ground truth output of At Risk=False, whereas tasks that were completed after the due date have a ground truth output of At Risk=True. Additionally, tasks with sporadic actions, tasks with frequently shifting due dates, and tasks that appear abandoned, i.e., tasks not marked complete, and with no actions for an extended period of time, may also be included in the training data and have a ground truth output of At Risk=True, in some example implementations. As described above, during run-time the computing device 10 is configured to output an alert 44 when the task is predicted to be at risk of not being completed by the predetermined due date.

Figure 2B:
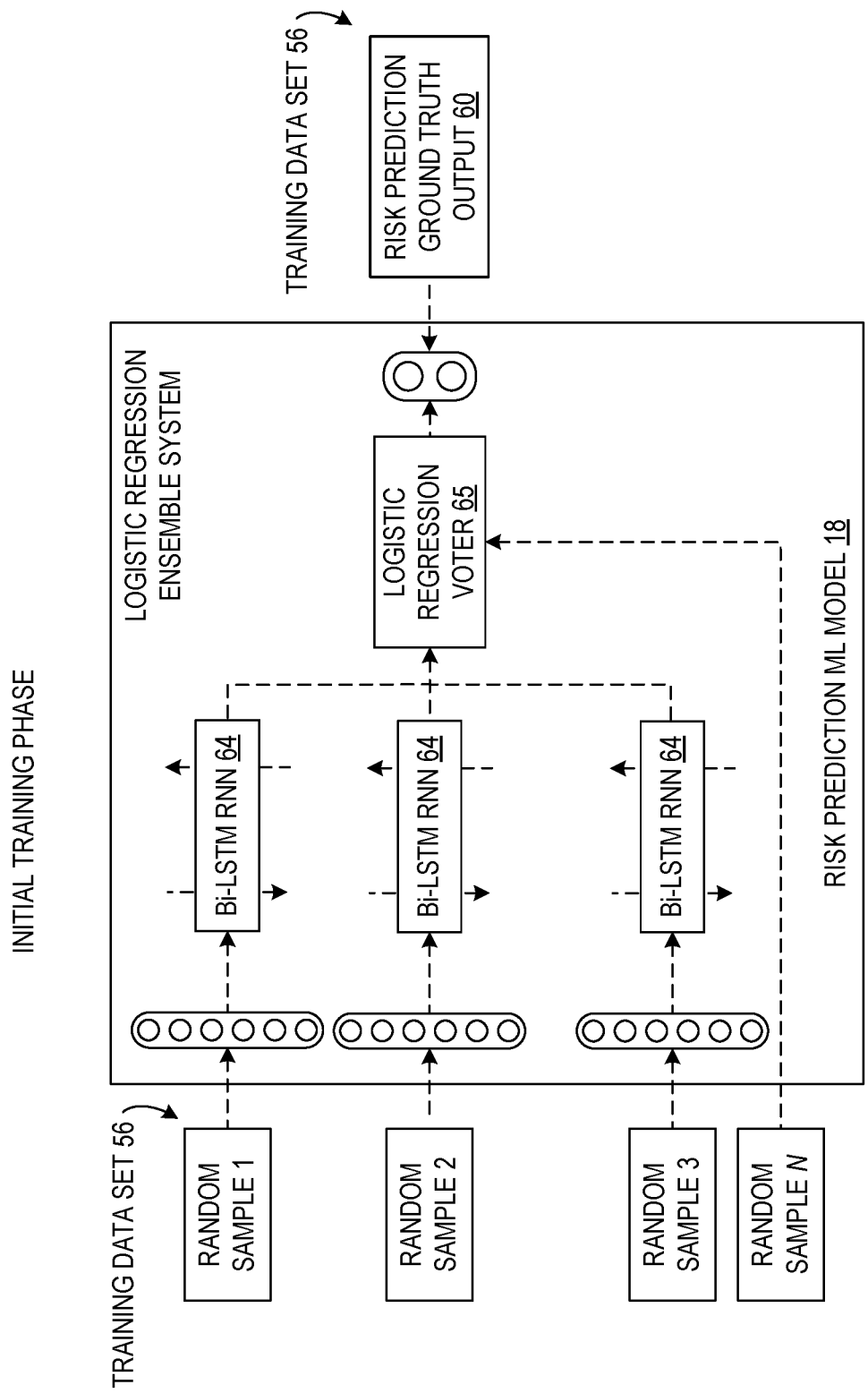

As illustrated in FIG. 2B, to further increase the accuracy of the risk prediction ML model 18, the BiLSTM RNN 64 may be one of a plurality of parallel BiLSTM RNNs 64. Each of the BiLSTM RNNs 64 is trained on a different random sample of the training data set. A logistic regression voting layer 65 may be provided downstream of each of the parallel BiLSTM RNNs, which itself has been trained on a random sample of the training data set 56. The resulting architecture, it will be appreciated, is a LOgistic REgression ENSemble (LORENS) model based on Logistic Regression Classification by Ensembles from Random Partitions (LR-CERP). A technical advantage of this architecture been found to be increased accuracy of prediction.

Although the risk prediction ML model 18 is shown in FIGS. 2A and 2B to be a BiLSTM RNN and a LORENS model comprised of a plurality of BiLSTM RNNs, it will be appreciated that alternative architectures could be used. For example, a convolutional neural network or an attention-based transformer model may be utilized. Further different layers may be incorporated into the above-described examples, such as self-attention layers, convolutional layers, additional hidden layers, etc., without departing from the spirit and scope of this disclosure.

Figure 3:
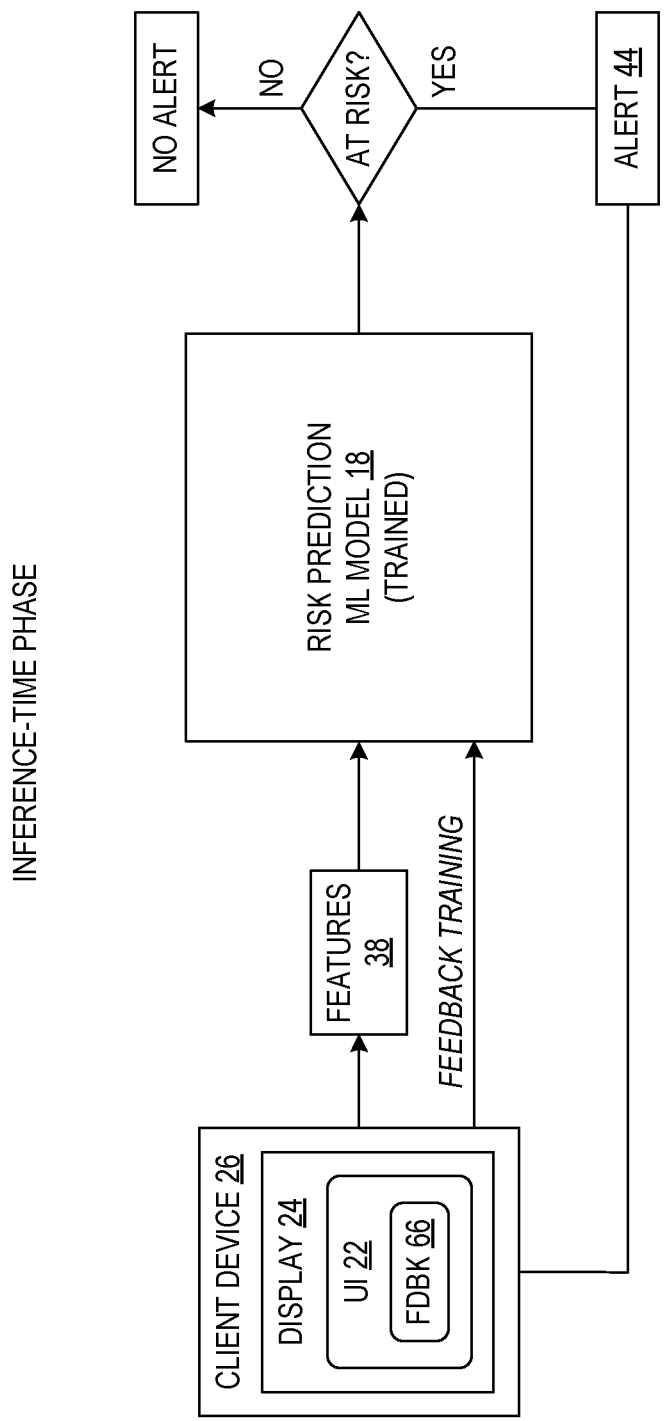
FIG. 3 is a schematic diagram of a risk prediction machine learning model of the computing system of FIG. 1 during an inference-time phase.

A schematic diagram of the risk prediction ML model 18 during an inference-time phase is illustrated in FIG. 3. Continuing with the example from above, the team member involved in a collaborative project may perform an action 20 on a task via the client device 26. The action 20 is processed, and telemetry data 30 associated with the action 20 is output. The task feature module 36 included in the collaborative project management program 16 extracts and outputs a plurality of features 38 associated with the task from the telemetry data 30. The risk prediction ML model 18 is configured to receive, as inference-time input, features 38 associated with the task.

When the task is predicted to be at risk of not being completed on time, the system 100 outputs an alert 44 to the client device 26. The computing device 10 may be configured to collect the user input, indicating whether the predicted risk assessment for the task is correct, as user feedback 66, as indicated in FIG. 3. The feedback 66 may be collected via an implicit user feedback interface, such as work performed on the task in the user interface 22, or an explicit user feedback interface 68, and the risk prediction ML model 18 may be configured to perform feedback training based at least in part on the user feedback 66. An example of implicit feedback is the telemetry collection module 28 collecting data regarding whether the team member interacted with the task when the task was indicated to be at risk, such as performing one or more actions 20 to advance completion of the task. Explicit feedback may be collected via a selector in the client user interface 22, as discussed below with reference to FIG. 4.

Figure 4:
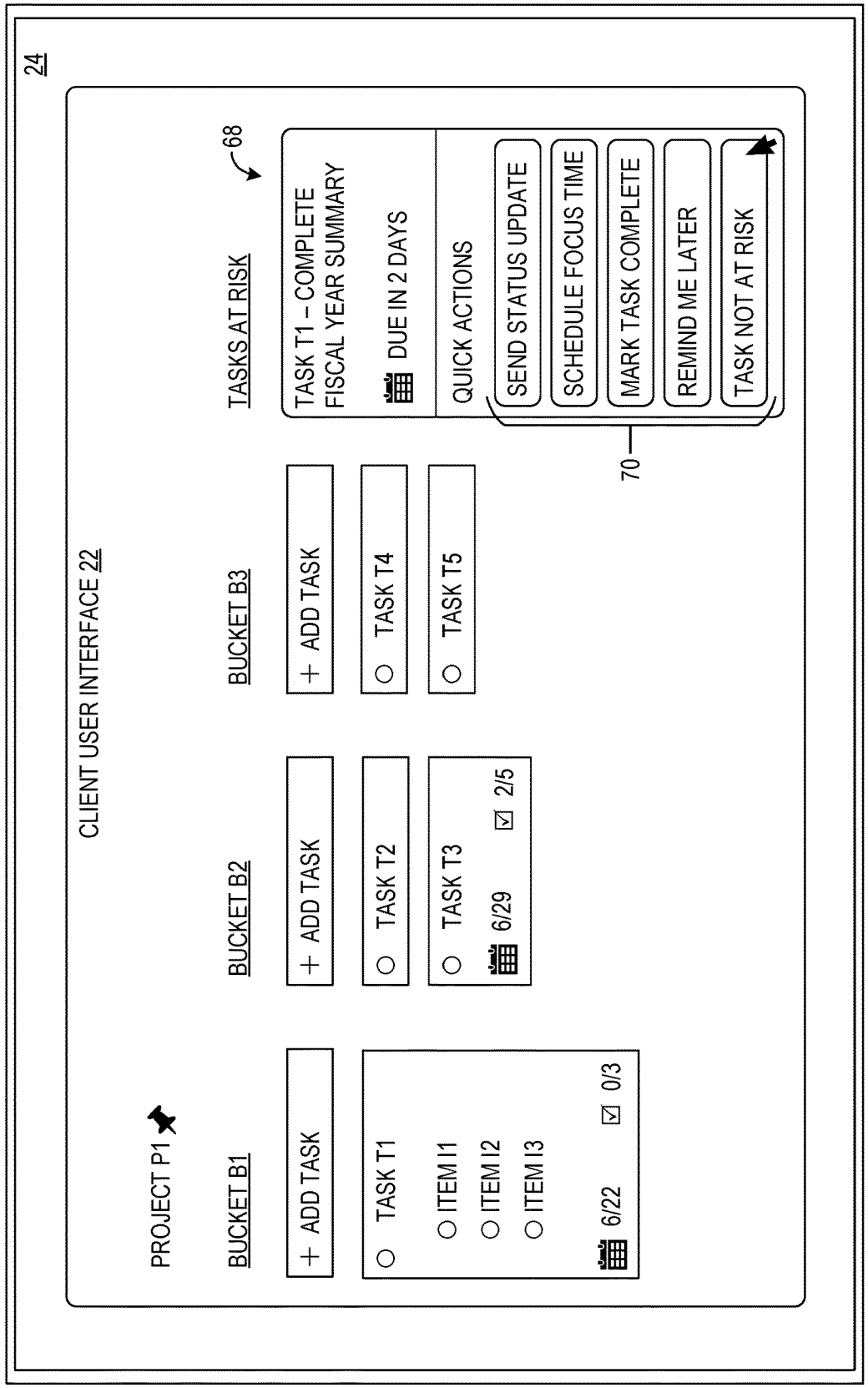
FIG. 4 is a schematic diagram of a client user interface of the computing system of FIG. 1.

FIG. 4 is an example of a client user interface 22 showing a project view for a team member assigned to a collaborative project P1. As illustrated, tasks T1, T2, T3, T4, T5 within the project P1 may be grouped into user-defined buckets B1, B2, B3 based on characteristics such as priority, subject matter, due date, anticipated duration, and the like. Tasks may be further broken down into checklist items, such as items I1, I2, I3 within task T1, as illustrated in FIG. 4. Task panes may further include features such as dues dates and number of checklist items completed to date. Tasks determined to be at risk by the risk prediction ML model 18 may be displayed in the explicit user feedback interface 68 in the client user interface 22. The explicit user feedback interface 68 may indicate a title of the task and how many days before the task is due, and provide a set of selectable buttons 70 that allow the team member to perform an action on the task, or to indicate the task is not at risk. In the example illustrated in FIG. 4, the "task not at risk" button is selected, thereby providing explicit user feedback that the prediction of the task as being at risk is incorrect.

Figure 5:
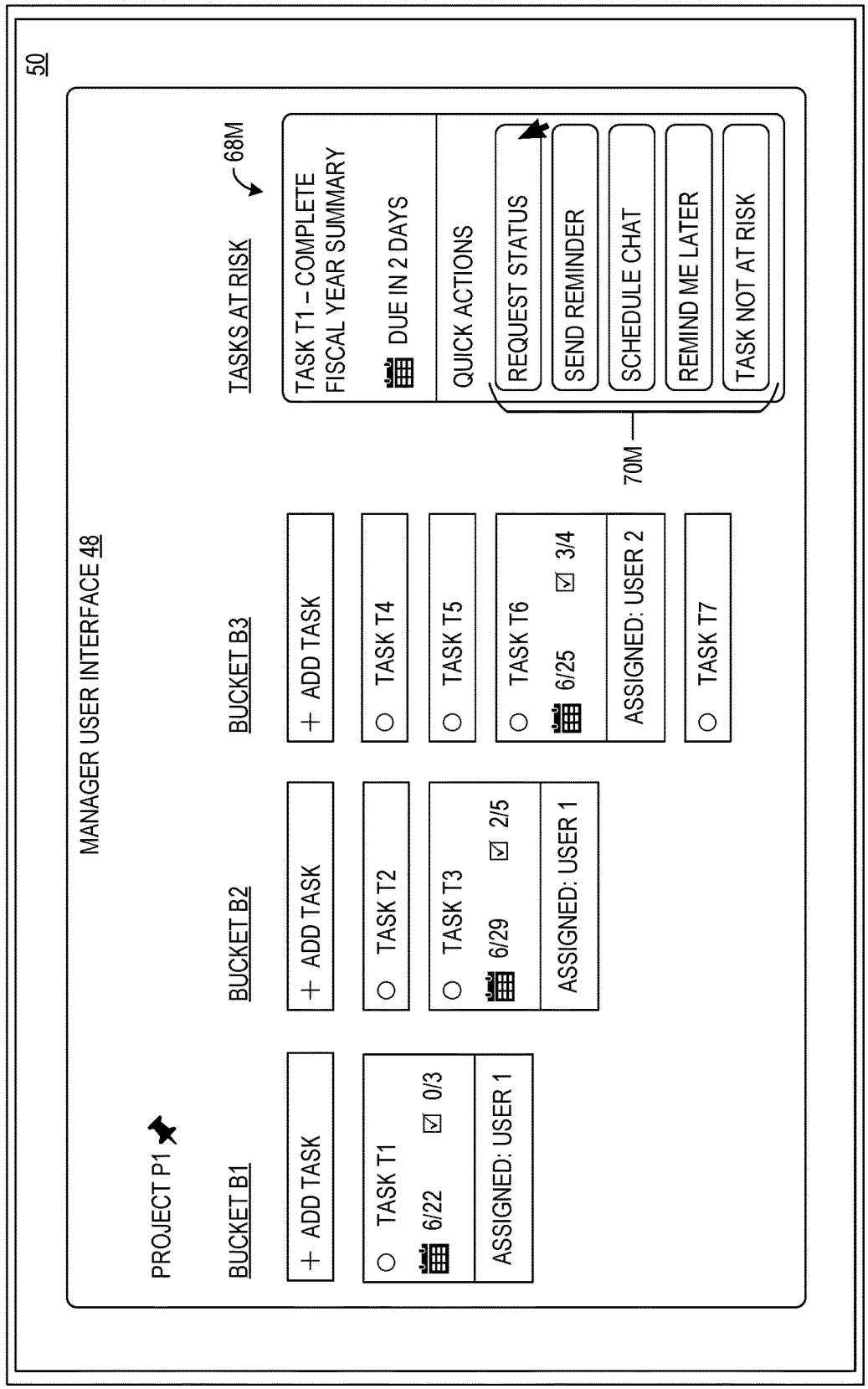
FIG. 5 is a schematic diagram of a manager user interface of the computing system of FIG. 1.

As described above, the system 100 may include a manager device 46 associated with a manager of the project. A schematic diagram of the manager user interface 48 is shown in FIG. 5. Similar to the client user interface 22, the manager user interface 48 may show tasks within the project P1, with tasks grouping into bucket and further broken down into checklist items. In the illustrated example, the manager user interface 48 shows tasks assigned to different users, i.e. User 1 and User 2. It will be appreciated that this configuration is merely exemplary, and that the client user interface 22 may also be configured to show tasks assigned to team members involved in the collaborative project in addition to the instant user. As describe above, in some implementations, when a task is determined to be at risk, the alert 44 may be sent to the manager device 46, instead of or in addition to the client device 26. To this end, the manager user interface 48 may be configured to display an explicit manager feedback interface 68M to indicate tasks at risk of not being completed on time. As with the explicit user feedback interface 68 displayed in the client user interface 22, the explicit manager feedback interface 68M may indicate a title of the task and how many days before the task is due, and provide a set of selectable buttons 70M that allow the project manager to perform an action on the task, or to indicate the task is not at risk. As shown in FIG. 5, the buttons 70M provided to the manager may include actions directed to the team member assigned to the task, such as "request status" and "send reminder," for example.

As discussed above with reference to FIG. 1, the predicted risk for the task may be determined at least in part by a least one attribute 22 of the task. FIG. 6 is a table of example task attributes 22, which may be categorized as intrinsic attributes 22I or extrinsic attributes 22E. Intrinsic attributes describe a task without interference of the team member and regardless of other tasks in the project. Examples of intrinsic attributes that are independent of a user include task complexity, a pre-defined length of the task, task type, and urgency (i.e., a task marked "urgent" by an assigner). Of the intrinsic attributes, tasks that are complex and/or long-term are typically at risk of not being completed on time, if at all. Extrinsic attributes are characteristics that describe a task and are set and changed by user, such as the project manager and/or team member assigned to the task. These attributes include the task due date, priority, dependencies, and assignees. Tasks with upcoming due dates may be more at risk of not being completed on time than tasks with respectively later due dates. Additionally, tasks with complicated dependencies, such as close deadlines, multiple teams involved with the task, and/or high priority, may be more at risk of not being completed on time than a task with few or no dependencies.

As described in detail above, the risk prediction ML model 18 is configured to receive, as inference-time input, the features 38 associated with the task. The features 38 can be used as signals for predicting tasks at risk of failing to be completed on time. FIG. 7 is a table of example task features. Each feature 38 is categorized as one of a project-level feature, a bucket-level feature, a task-level feature, or a user-level feature. Project-level and bucket-level task describe the activity and progress inside the project and bucket, respectively. User-level feature focus on capturing task management style of the team member, indicated by number of actions per session and/or number of different views accessed, and workload of the team member assigned to the task, indicated by a number of completed actions and/or number of user sessions, for example. Task-level features describe the task history through current time by recording counts of various actions with high granularity on change type and time. For each action, task-level features include its change type, description deletion count, description creation, and description modification count. The number of actions per task and per day of week are also included in task-level features. The level, signal, name, and description of 85 unique features is provided below in Table 1. It will be appreciated that Table 1 is not meant to be an exhaustive list of features, but is merely exemplary in nature.

TABLE 1

| Level | Signal | Name | Description |
|---|---|---|---|
| Project | General History | NumTasks | Number of other tasks inside the same project of this task |
| | | NumCompleteTasks | Number of 100% completed tasks inside the same project of this task |
| | | NumUniqueInteractors | Number of unique users interacting with the project of this task |
| | | NumActions | Number of total actions on the project of this task |
| Bucket | General History | NumTasks | Number of other tasks inside the same bucket of this task |
| | | NumUniqueInteractors | Number of unique users interacting with the bucket of this task |
| | | NumTitleActions | Number of times title of a bucket has been created or changed |
| | | NumOrderHintActions | Number of times the order of a bucket has been changed |
| Task | General History | NumPastActions (total, Mon, Tues, Weds, Thurs, Fri, Sat, Sun) | Number of total actions done since task creation till this moment. Computed for each day as well |
| | | NumAppliedCategoriesActions (total, create, delete) | Number of actions of assigning labels to a task. Computed for total and for each type of action |
| | | MeanAppliedCategoriesCharLength | Mean of number of characters of applied labels |
| | | MedianAppliedCategoriesCharLength | Median of number of characters of applied labels |
| | | StDevAppliedCategoriesCharLength | Standard deviation of number of characters of applied labels |

TABLE 1-continued

| Level | Signal | Name | Description |
|---|---|---|---|
| | | NumBucketIdActions | Number of times a task's bucket has been changed |
| | | NumPreviewTypeActions | Number of times a task has been viewed |
| | | LastPreviewType | The type of last view of a task |
| | | TopPreviewType | The type of highest view of a task |
| | | NumUserSchedulePreviewType | How many times action doer has opened schedule view |
| | | NumProjectSchedulePreviewType | How many times action doer has opened project view |
| | | AgeInDays | Number of days since creation of a task |
| | | NumOrderHintActions (total, create, modify) | Number of times the order of a task has been created or changed inside of its bucket |
| | | OrderHintValue | The current order of the task inside its bucket |
| | | NumStartDateActions (total, create, modify) | Number of times start date has been created or changed |
| | | StartDateValue | Number of days since start time of a task |
| | | NumPriorityActions (total, create, modify) | Number of times priority of a task has been created or changed |
| | | PriorityValue | The current priority value of a task |
| | | NumTasksBySameCreator | The number of tasks created by the same task creator |
| | | AssignedToSelf? | Boolean indicating if the task creator was the same person as the task assignee |
| | Complexity | NumUniqueInteractors | Number of unique users that have done any action related to this task |
| | | NumAssignmentActions (total, create, modify, delete) | Number of times an assignment has been created, modified, or deleted |
| | | NumUniqueAssignees | Number of unique users assigned to a task |
| | | NumTitleActions (total, create, modify) | Number of times a task title is created or changed |
| | | TitleCharLength | The current number of characters of the task title |
| | | NumDescriptionActions (total, create, modify) | Number of times a task description has been created or changed |
| | | DescriptionCharLength | The current number of characters of description of the task |
| | | NumDueDateActions (total, create, modify) | The number of times the due date is created or changed |
| | | DueDateValue | The current due date of the task as the number of days left |
| | | NumReferencesActions (total, create, modify, delete) | Number of times attachments have been added, modified, or deleted in the task |
| | | MeanReferencesCharLength | Mean of number of characters of attachments to the task |
| | | MedianReferencesCharLength | Median of number of characters of attachments to the task |
| | | StDevReferencesCharLength | Standard deviation of number of characters of attachments to the task |
| | | NumConversationActions (total, create, modify) | Number of comments created or changed on the task |

TABLE 1-continued

| Level | Signal | Name | Description |
|---|---|---|---|
| | | NumUniqueUsersInConversation | Number of unique users involved in the conversation on the task |
| | Progress | NumChecklistActions (total, create, modify, delete) | Number of checklist items created, changed, or deleted in the task |
| | | NumCompleteChecklistActions | Number of 100% completed checklist items in the task |
| | | NumPercentCompleteActions (total, create, modify, delete) | Number of times progress on a task has been recorded or changed |
| | | PercentCompleteValue | The current progress percentage on the task |
| User | Workload & progress | NumCompTasksByUserInProject | Number of other tasks in this project 100% completed by assignee of this task |
| | | NumOfSessionsByUser | Number of times action doer logs in to the system and interacts with this task |
| | Management Style | NumOfActionsByUserPerSession | Number of other actions done by the action doer in the session |
| | | NumOfUserScheduleViewByUser | Number of times action doer views their personal schedule |
| | | NumOfProjectScheduleViewByUser | Number of times action doer views the project's schedule |

The effectiveness of a variety of configurations of the risk prediction ML model 18 has been investigated and found to offer differing accuracies, with associated computational and storage tradeoffs, as follows. The risk prediction ML model 18 described herein has been found to achieve an accuracy of 89% by using project-level, bucket-level, task-level, and user-lever features with ensemble voting of a plurality of BiLSTM RNNs. However, tasks at risk may be predicted with similar modeling, which may offer processing speed advantages or require less data storage, albeit with reduced accuracy. For example, in some implementations, a subset of the features 38 described above can be used to predict whether a task is at risk of not being completed on time. For example, project-level, bucket-level, and user-level features may be filtered out, and only task-level features included in the input layer for the risk prediction ML model 18. A task-level feature may represent a state of the task at a point in time when an action 20 was detected, a sequence of states in which each state represents new actions, and/or a sequence of all states corresponding to all actions performed on the task. To prevent the risk prediction ML model 18 from cheating during training, states in which tasks are indicated to be at or after completion may be masked out. A BiLSTM risk prediction model trained on such a subset of features was determined to have an accuracy of 82%. Masking task states that occurred earlier in the history of the task (i.e., closer to creation of the task) resulted in an average of 81% accuracy. An ensemble voter in which the BiLSTM risk prediction model is trained with random sub-samples to leverage the random samples in voting rather than averaging the final accuracy increased accuracy of the BiLSTM risk prediction model to 85%. In this implementation, a plurality of BiLSTM RNNs were independently trained with random sample as described for the implementations above, and an additional random sample was used to train a Logistic Regression voter. Finally, including the project-level, bucket-level, and user-level features in addition to the task-level features with ensemble voting of BiLSTM RNNs achieved an accuracy of 89%. This indicates that inputting additional feature vectors to indicate external factors, such the team member's workload and management style, as well as ongoing activity in the same project and bucket, increases accuracy for predicting whether a task is at risk.

Figure 8:
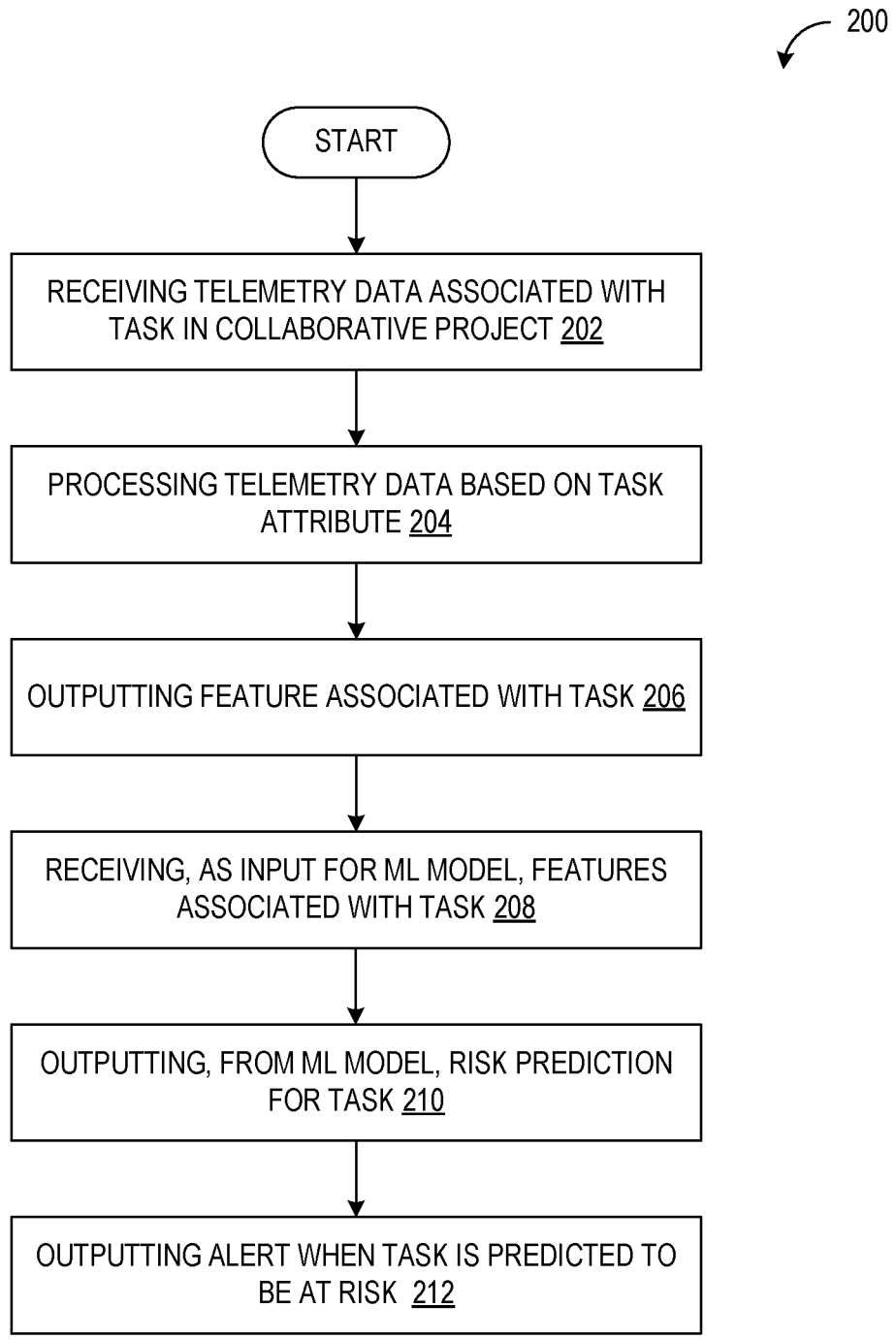
FIG. 8 shows a flow diagram of a method for identifying tasks at risk according to one example of the present disclosure.

FIG. 8 shows a flow diagram of a method 200 for identifying tasks at risk according to one example of the present disclosure. The method 200 is preferably implemented on a computing device of a computing system that includes an machine learning model for predicting a completion date for a task to determine whether the task is at risk of not being completed on time.

At step 202, the method 200 may comprise receiving telemetry data associated with a task in a collaborative project management program. When a team member performs an action of a task, a telemetry collection module included in the computing device detects and processes the action, and outputs telemetry data associated with the action. A collaborative management program is configured to receive the telemetry data.

Continuing from step 202 to step 204, the method 200 may include processing the telemetry data based at least in part on one or more attributes of the task. The collaborative management program may include task attribute settings. In some implementations, the task attribute settings may be included in the computing system as default settings. Additionally or alternatively, the task attribute settings may be uploaded and/or modified by a team member and/or manager of a project. As described in detail above with reference to FIG. 6, the task attributes may be categorized as intrinsic attributes or extrinsic attributes. Intrinsic attributes describe a task without interference of the team member and regardless of other tasks in the project. Examples of intrinsic attributes that are independent of a user include task complexity, a pre-defined length of the task, task type, and urgency.

Proceeding from step 204 to step 206, the method 200 may include outputting at least one feature associated with the task. The collaborative project management program may further include a task feature module that is configured to extract and output at least one feature associated with the task from the telemetry data. In the embodiment described herein, the at least one feature is one of a plurality of features output by the collaborative project management program.

Advancing from step 206 to step 208, the method 200 may include receiving, as input for an machine learning model, the at least one feature associated with the task. The features can be used as signals for predicting tasks at risk of failing to be completed on time. Each feature is categorized as one of a project-level feature, a bucket-level feature, a task-level feature, or a user-level feature, examples of which are described above with reference to FIG. 7. It will be appreciated that the task feature module may be updated as new features are recognized.

Continuing from step 208 to step 210, the method 200 may include responsive to receiving the at least one feature, outputting a risk prediction for the task. The risk prediction indicates whether the task is predicted to be on track to be completed by a predetermined deadline.

Proceeding from step 210 to step 212, the method 200 may include outputting an alert when the task is predicted to be at risk of not being completed by a predetermined due date. The alert may be sent to the client device where it is presented as a visual alert to the team member via the user interface. In some configurations, the system may include a manager device associated with a manager of the project. The computing device may be configured to output the alert to the manager device, instead of or in addition to outputting the alert to the client device. As with the client device, the alert may be presented as a visual alert to the manager via a user interface on a display. Additionally or alternatively, the alert may be output to the client device and/or the manager device as an aural alert and/or an email alert.

Task prioritization is a fundamental aspect of collaborative task management. Ineffective prioritization by individual team members puts team tasks at a risk of failure. The system described herein provides a technical solution for predicting tasks at risk of not being completed on time, using machine learning models trained on historical telemetry data gathered from user devices. Early identification of such risks based on a wide array of telemetry data can help improve task prioritization by individual users. For example, users can be informed of such risks via digital assistants and/or task management tools, which provide the user an opportunity to address the situation by assigning the task a higher priority or delegating the task to a different user. As a result, outcomes can be improved for on-time completion of tasks.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
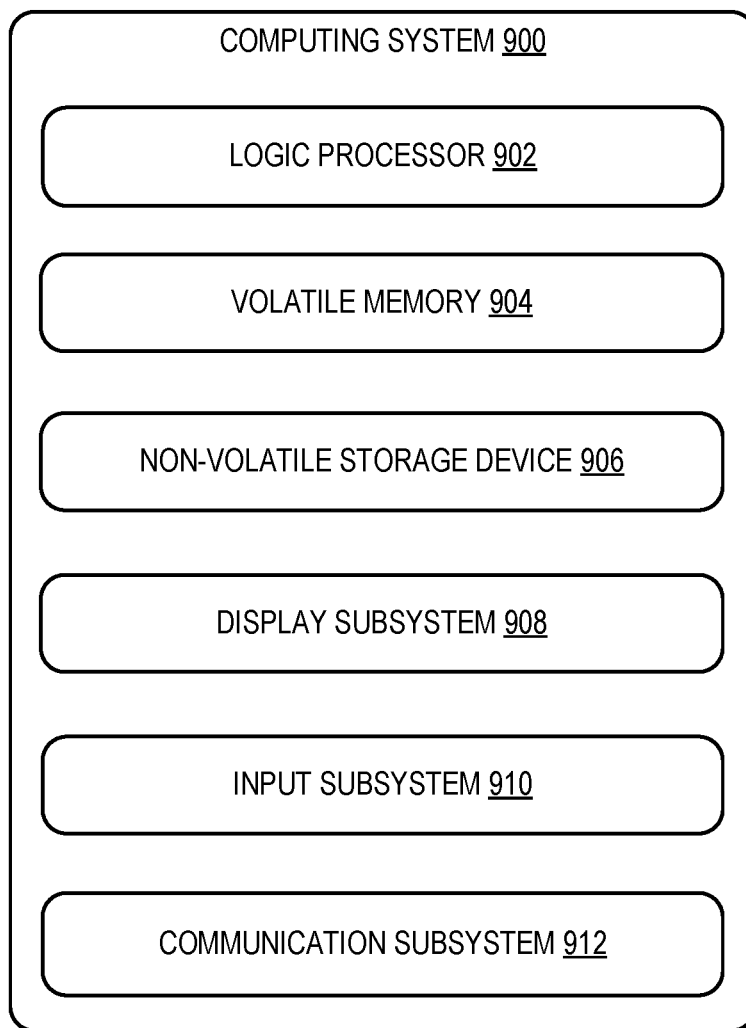
FIG. 9 shows a schematic view of an example computing environment in which the computer system of FIG. 1 may be implemented.

FIG. 9 schematically shows a non-limiting embodiment of a computing system 900 that can enact one or more of the methods and processes described above. Computing system 900 is shown in simplified form. Computing system 900 may embody the computing device 10 described above and illustrated in FIG. 1. Computing system 900 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 900 includes a logic processor 902 volatile memory 904, and a non-volatile storage device 906. Computing system 900 may optionally include a display subsystem 908, input subsystem 910, communication subsystem 912, and/or other components not shown in FIG. 9.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 906 includes one or more physical devices configured to hold instructions executable by the logic processors to implement the methods and processes described herein. When such methods and processes are implemented, the state of non-volatile storage device 906 may be transformed, e.g., to hold different data.

Non-volatile storage device 906 may include physical devices that are removable and/or built in. Non-volatile storage device 906 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 906 may include nonvolatile, dynamic, static, read/write, read-only, sequential-access, location-addressable, file-addressable, and/or content-addressable devices. It will be appreciated that non-volatile storage device 906 is configured to hold instructions even when power is cut to the non-volatile storage device 906.

Volatile memory 904 may include physical devices that include random access memory. Volatile memory 904 is typically utilized by logic processor 902 to temporarily store information during processing of software instructions. It will be appreciated that volatile memory 904 typically does not continue to store instructions when power is cut to the volatile memory 904.

Aspects of logic processor 902, volatile memory 904, and non-volatile storage device 906 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 typically implemented in software by a processor to perform a particular function using portions of volatile memory, which function involves transformative processing that specially configures the processor to perform the function. Thus, a module, program, or engine may be instantiated via logic processor 902 executing instructions held by non-volatile storage device 906, using portions of volatile memory 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 908 may be used to present a visual representation of data held by non-volatile storage device 906. The visual representation may take the form of a graphical user interface (GUI). As the herein described methods and processes change the data held by the non-volatile storage device, and thus transform the state of the non-volatile storage device, the state of display subsystem 908 may likewise be transformed to visually represent changes in the underlying data. Display subsystem 908 may include one or more display devices utilizing virtually any type of technology. Such display devices may be combined with logic processor 902, volatile memory 904, and/or non-volatile storage device 906 in a shared enclosure, or such display devices may be peripheral display devices.

When included, input subsystem 910 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 912 may be configured to communicatively couple various computing devices described herein with each other, and with other devices. Communication subsystem 912 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 900 to send and/or receive messages to and/or from other devices via a network such as the Internet.

The following paragraphs provide additional description of aspects of the present disclosure. One aspect provides a computing system for identifying tasks at risk in a collaborative project. The computing system may comprise a computing device including one or more processors. The one or more processors may be configured to execute instructions using portions of associated memory to implement, during an inference-time phase, a collaborative project management program and an machine learning model. The collaborative project management program may be configured to receive telemetry data associated with a task, process the telemetry data based at least in part on one or more attributes of the task, and output at least one feature associated with the task. The machine learning model may be configured to receive, as inference-time input, the at least one feature associated with the task. Responsive to receiving the at least one feature, the machine learning model may be configured to output a risk prediction for the task. The computing system may be configured to output an alert when the task is predicted to be at risk of not being completed by a predetermined due date.

In this aspect, additionally or alternatively, during an initial training phase, the collaborative project management program may be configured to receive training phase telemetry data associated with a plurality of tasks completed by a plurality of users. In this aspect, additionally or alternatively, the machine learning model may be trained in the initial training phase with a training data set including a plurality of training data pairs derived from the training phase telemetry data. Each training data pair may include a training phase input indicating a feature associated with a task and ground truth output indicating a risk prediction for the paired task. In this aspect, additionally or alternatively, the machine learning model may include a bidirectional long short-term memory neural network.

In this aspect, additionally or alternatively, the at least one feature may be one of a plurality of features output by the collaborative project management program. Each feature of the plurality of feature may be categorized as one of a project-level feature, a bucket-level feature, a task-level feature, or a user-level feature.

In this aspect, additionally or alternatively, the computing system may further comprise a user interface. The alert may be presented to a user via the user interface. In this aspect, additionally or alternatively, the alert may be configured as at least one of a visual alert, an aural alert, and an email message.

In this aspect, additionally or alternatively, during a feedback training phase, the machine learning model may be configured to collect user feedback via an implicit or explicit user feedback interface and perform feedback training of the machine learning model based at least in part on the user feedback.

In this aspect, additionally or alternatively, the risk prediction for the task may be determined at least in part by a least one attribute of the task. In this aspect, additionally or alternatively, intrinsic attributes of the task that are independent of a user include task complexity, a pre-defined length of the task, task type, and urgency. In this aspect, additionally or alternatively, extrinsic attributes of the task that can be set and changed by a user include due date, priority, dependencies, and assignees.

Another aspect provides a method for identifying tasks at risk in a collaborative project. The method may comprise, at one or more processors of a computing system, during an inference-time phase, receiving telemetry data associated with a task in a collaborative project management program. The method may further comprise processing the telemetry data based at least in part on one or more attributes of the task. The method may further comprise outputting at least one feature associated with the task. The method may further comprise receiving, as input for an machine learning model, the at least one feature associated with the task. The method may further comprise responsive to receiving the at least one feature, outputting a risk prediction for the task. The method may further comprise outputting an alert when the task is predicted to be at risk of not being completed by a predetermined due date.

In this aspect, additionally or alternatively, the method may further comprise, during an initial training phase, receiving training phase telemetry data associated with a plurality of tasks completed by a plurality of users. In this aspect, additionally or alternatively, the method may further comprise, during the initial training phase, training the machine learning model with a training data set including a plurality of training data pairs derived from the training phase telemetry data. Each training data pair may include a training phase input indicating a feature of a task and ground truth output indicating a risk prediction for the paired task. In this aspect, additionally or alternatively, the method may further comprise, including in the machine learning model a bidirectional long short-term memory neural network.

In this aspect, additionally or alternatively, the at least one feature is one of a plurality of features output by the collaborative project management program, and the method may further comprise categorizing each feature of the plurality of features as one of a project-level feature, a bucket-level feature, a task-level feature, or a user-level feature.

In this aspect, additionally or alternatively, the method may further comprise presenting the output alert to a user via a user interface.

In this aspect, additionally or alternatively, the method may further comprise, during a feedback training phase, collecting user feedback via an implicit or explicit user feedback interface, and performing feedback training of the machine learning model based at least in part on the user feedback.

In this aspect, additionally or alternatively, the method may further comprise determining the risk prediction for the task at least in part by a least one attribute of the task.

Another aspect provides a computing system for identifying tasks at risk in a collaborative project. The computing system may comprise a computing device including one or more processors. The one or more processors may be configured to execute instructions using portions of associated memory to implement, during an inference-time phase, a collaborative project management program and an machine learning model. The collaborative project management program may be configured to receive telemetry data associated with a task, process the telemetry data based at least in part on one or more attributes of the task, and output at least one feature associated with the task. The machine learning model may be configured to receive, as inference-time input, the at least one feature associated with the task. Responsive to receiving the at least one feature, the machine learning model may be configured to output a risk prediction for the task. The computing system may be configured to output an alert when the task is predicted to be at risk of not being completed by a predetermined due date. During an initial training phase, the collaborative project management program may be configured to receive training phase telemetry data associated with a plurality of tasks completed by a plurality of users. The machine learning model may be trained during the initial training phase with a training data set including a plurality of training data pairs derived from the plurality of users. Each training data pair may include a training phase feature indicating an attribute of a task and ground truth output indicating a risk prediction for the paired task. During a feedback training phase, the machine learning model may be configured to collect user feedback via an implicit or explicit user feedback interface and perform feedback training of the machine learning model based at least in part on the user feedback.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system for identifying tasks at risk in a collaborative project, comprising:
a client computing device on which an action on a task of a collaborative project is performed; and
a server device including one or more processors configured to execute instructions using portions of associated memory to implement, during an inference-time phase:
a telemetry collection module configured to detect the action on the task, process the action, and output telemetry data associated with the action;
a collaborative project management program configured to receive the telemetry data associated with the action, process the telemetry data based at least in part on one or more attributes of the task, and output at least one feature associated with the task; and
a machine learning model including a trained neural network, the machine learning model being configured to:
receive, as inference-time input, at least one feature vector representing the at least one feature associated with the task; and
responsive to receiving the at least one feature vector, output a risk prediction for the task, wherein
the machine learning model is trained in an initial training phase with a training data set including a plurality of training data pairs, each training data pair including a training phase input indicating a training feature vector representing a training feature associated with a training task and ground truth output indicating a risk prediction for the training task, and
the system is configured to output an alert when the task is predicted to be at risk of not being completed by a predetermined due date.

2. The computing system of claim 1, wherein
during the initial training phase, the collaborative project management program is configured to receive training phase telemetry data associated with a plurality of tasks completed by a plurality of users.

3. The computing system of claim 2, wherein
the training data pairs are derived from the training phase telemetry data.

4. The computing system of claim 1, wherein
the machine learning model includes a bidirectional long short-term memory neural network.

5. The computing system of claim 1, wherein
the at least one feature is one of a plurality of features output by the collaborative project management program, and
each feature of the plurality of features is categorized as one of a project-level feature, a bucket-level feature, a task-level feature, or a user-level feature.

6. The computing system of claim 1, further comprising:
a user interface, wherein
the alert is presented to a user via the user interface.

7. The computing system of claim 6, wherein
the alert is configured as at least one of a visual alert, an aural alert, and an email message.

8. The computing system of claim 1, wherein
during a feedback training phase, the machine learning model is configured to:
collect user feedback via an implicit or explicit user feedback interface, and
perform feedback training of the machine learning model based at least in part on the user feedback.

9. The computing system of claim 1, wherein
the risk prediction for the task is determined at least in part by a least one attribute of the task.

10. The computing system of claim 1, wherein
intrinsic attributes of the task that are independent of a user include task complexity, a pre-defined length of the task, task type, and urgency.

11. The computing system of claim 1, wherein
extrinsic attributes of the task that can be set and changed by a user include due date, priority, dependencies, and assignees.

12. A method for identifying tasks at risk in a collaborative project, the method comprising:
at a client computing device, performing an action on a task of a collaborative project;
at a server device including one or more processors, during an inference-time phase:
at a telemetry collection module, detecting the action on the task, processing the action, and outputting telemetry data associated with the action;
receiving the telemetry data associated with the action in a collaborative project management program;
processing the telemetry data based at least in part on one or more attributes of the task;
outputting at least one feature associated with the task;
receiving, as inference-time input for a machine learning model including a neural network, at least one feature vector representing the at least one feature associated with the task;
responsive to receiving the at least one feature vector, outputting a risk prediction for the task; and
outputting an alert when the task is predicted to be at risk of not being completed by a predetermined due date, wherein
the machine learning model is trained in an initial training phase with a training data set including a plurality of training data pairs, each training data pair including a training phase input indicating a training feature vector representing a training feature associated with a training task and ground truth output indicating a risk prediction for the training task.

13. The method of claim 12, the method further comprising:
during the initial training phase, receiving training phase telemetry data associated with a plurality of tasks completed by a plurality of users.

14. The method of claim 13, the method further comprising:
deriving training data pairs derived from the training phase telemetry data.

15. The method of claim 12, the method further comprising:
including in the machine learning model a bidirectional long short-term memory neural network.

16. The method of claim 12, wherein
the at least one feature is one of a plurality of features output by the collaborative project management program, and
the method further comprises:
categorizing each feature of the plurality of features as one of a project-level feature, a bucket-level feature, a task-level feature, or a user-level feature.

17. The method of claim 12, the method further comprising:
presenting the output alert to a user via a user interface.

18. The method of claim 12, the method further comprising:
during a feedback training phase, collecting user feedback via an implicit or explicit user feedback interface, and
performing feedback training of the machine learning model based at least in part on the user feedback.

19. The method of claim 12, the method further comprising:
determining the risk prediction for the task at least in part by a least one attribute of the task.

20. A computing system for identifying tasks at risk in a collaborative project, comprising:
a client computing device on which an action on a task of a collaborative project is performed; and
a server device including one or more processors configured to execute instructions using portions of associated memory to implement:
a telemetry collection module configured to detect the action on the task, process the action, and output telemetry data associated with the action;
a collaborative project management program configured to receive the telemetry data associated with the action, process the telemetry data based at least in part on one or more task attributes, and output at least one feature associated with the task; and
a machine learning model including a trained neural network, the machine learning model being configured to:
receive, as inference-time input, at least one feature vector representing the at least one feature associated with the task; and
responsive to receiving the at least one feature, output a risk prediction for the task, wherein
the at least one feature is one of a plurality of features output by the collaborative project management program,
each feature of the plurality of features is categorized as one of a project-level feature, a bucket-level feature, a task-level feature, or a user-level feature,
the system is configured to output an alert when the task is predicted to be at risk of not being completed by a predetermined due date, during an initial training phase, the collaborative project management program is configured to receive training phase telemetry data associated with a plurality of tasks completed by a plurality of users, the machine learning model is trained during the initial training phase with a training data set including a plurality of training data pairs derived from the plurality of users, each training data pair including a training phase feature indicating an attribute of a training task and ground truth output indicating a risk prediction for the training task, and during a feedback training phase, the machine learning model is configured to:
  collect user feedback via an implicit or explicit user feedback interface; and
  perform feedback training of the machine learning model based at least in part on the user feedback.

* * * * *